United States Patent
Boisvert

(12)
(10) Patent No.: US 6,280,125 B1
(45) Date of Patent: Aug. 28, 2001

(54) R-8 COLLET

(76) Inventor: Marc H Boisvert, 1 Lenway Rd., Byfield, MA (US) 01922

( * ) Notice: Subject to any disclaimer, the term of this patent is extended or adjusted under 35 U.S.C. 154(b) by 0 days.

(21) Appl. No.: 09/407,837

(22) Filed: Sep. 28, 1999

Related U.S. Application Data

(63) Continuation-in-part of application No. 09/134,878, filed on Aug. 15, 1998, now Pat. No. 5,957,636.
(51) Int. Cl.⁷ .................. B23B 31/02; B23C 5/26
(52) U.S. Cl. .............. 409/131; 279/51; 408/239 R; 409/232; 409/233
(58) Field of Search .................. 409/131, 232, 409/233, 234, 132; 279/43.1, 51; 408/239 A, 239 R

(56) References Cited

U.S. PATENT DOCUMENTS

| | | | | |
|---|---|---|---|---|
| 2,686,682 | * | 8/1954 | Csaki | 279/51 |
| 5,846,037 | * | 12/1998 | Boisvert | 409/233 |
| 5,885,039 | * | 3/1999 | Boisvert | 409/233 |
| 5,957,636 | * | 9/1999 | Boisvert | 409/232 |

FOREIGN PATENT DOCUMENTS

179024 * 4/1986 (EP) ..................... 279/51

* cited by examiner

*Primary Examiner*—Daniel W. Howell
(74) *Attorney, Agent, or Firm*—Don Halgren

(57) ABSTRACT

The present invention comprises an improved R-8 collet for insertion and attachment within a spindle of a milling machine. The R-8 collet comprises an elongated member having a first end of generally conical configuration with a bore arranged longitudinally therein. The R-8 collet has a second end with a gripping head thereon, for securement to a spindle in the machine. The gripping head comprises an enlarged member with a narrowed portion for gripping the R-8 collet within the spindle.

8 Claims, 2 Drawing Sheets

R-8 COLLET

This application is a continuation-in-part of copending application Ser. No. 09/134,878, filed on Aug. 15, 1998, now U.S. Pat. No. 5,957,636.

BACKGROUND OF THE INVENTION

1. Field of the Invention

This invention relates to collets for vertical milling machines, more particularly, an improved R-8 tool-holding collet arrangement to permit those vertical milling machines to be utilized more efficiently.

2. Prior Art

This Application is a continuation-in-part application of my earlier co-pending U.S. patent application Ser. No. 09/134,878 filed Aug. 15, 1998. That Application and my earlier issued U.S. Pat. No. 5,85,039 are each incorporated herein by reference in their entirety. That Application and my '039 U.S. patent relates to improvements to vertical milling machines which milling machines have been around for many years. One very common milling machine is the Bridgeport type, universal, standard vertical milling machine. The Bridgeport milling machine may be characterized by a vertical spindle, which is manually activated by a pull handle, to move a tool towards and push it away from the surface of an article to be worked. An "R-8" collet is the specific collet utilized to hold a specific tool in the lower end of the tool spindle of the Bridgeport type machine. A tool is inserted in the R-8 collet and the "Z" axis is set, and the tool is ready to work on a workpiece. When a new tool is needed, the R-8 collet is removed from the spindle, and the tool is removed from the R-8 collet, and the new tool inserted in its place. The R-8 collet is reinserted in the spindle, the "Z" axis is re-measured, and the new tool is applied to the workpiece. The original tool may need to be re-used, so that the process is again repeated by reinserting the tool in the R-8 collet and the "Z" axis again re-measured. The R-8 collet is needed because it provides a machined surface so as to accurately mate with the spindle, thereby maintaining accuracy of the tool during it's milling operation. This type of collet is known under its common name as an "R-8" collet, specifically as defined by ANSI specification, the R-8 being critical to this invention.

It is an object of the present invention to provide an improved R-8 collet.

It is a further object of the present invention to provide an R-8 collet for a Bridgeport type universal milling machine, wherein a succession of different tools may be more easily utilized more than once by that particular Bridgeport type universal milling machine.

BRIEF SUMMARY OF THE INVENTION

The present invention involves an "R-8" collet for use with a Bridgeport type vertical milling machine having an adjustable tool-feed arrangement thereon. This machine accepts an "R-8" type collet. This type of vertical milling machine typically includes a generally vertically disposed head, which rotatably encloses a vertically arranged spindle. The spindle is rotatably driven by a motor means connected thereto. The spindle comprises an elongated shaft having a central bore therethrough. The spindle is supported within the head of the milling machine by a plurality of bearings. The spindle is movable upwardly and downwardly by a rack-and-pinion arrangement arranged on the side of the head.

The lower end of the spindle encloses the "R-8" collet invention. The "R-8" collet of the present invention comprises an elongated, cylindrically-shaped member having a bored lower end into which a milling tool is secured. The "R-8" collet has a second or upper end which is gripped within the spindle. The outer periphery of the lower end of the "R-8" collet is tapered, so as to typically mate with the tapered internal surfaces at the lower end of the spindle. The tapered first end of the spindle has a plurality of radially directed cuts extending from a central, longitudinally directed bore therein. The bore is arranged to receive and maintain the securement of the milling tool.

The present invention comprises an R-8 collet with the upper end having a securement means or gripping head fixedly attached thereto. The securement means of the present invention may comprise a short, enlarged head that is receivable by a gripping arrangement at the lower end of the spindle. The enlarged head, no wider than the body of the "R-8" collet, in a first preferred embodiment comprises a first knob of circular cross-section having a pinched mid-portion. The pinched mid-portion permits the lower end of the spindle to encircle the mid-portion and hold it securely. The first knob has a lower stub end with external threads thereon. The stub end is threadedly received in a threaded female bore in the upper end of the R-8 collet body.

The machinist would then insert a milling tool within the bore of the first end of the collet, and then threadedly advance a securement collar tightly onto the threads of the tapered alignment sleeve. This assembly would then be mated to the spindle of the vertical milling machine, and the "Z" axis coordinate set for that respective tool in that particular collet, relative to the workpiece. The machining operation may thus be initiated. Tools (and their respective collets) may be changed in the milling machine by keeping the tool within its own R-8 collet, secured therein by the tightened sleeve/collar combination, thus maintaining the preset "Z" axis coordinates for each tool-carrying R-8 collet.

The improved R-8 collet in a second embodiment has an enlarged head consisting of a spherically shaped member with a threaded stud thereattached. The threaded stud is mated with the threaded female bore in the upper end of the R-8 collet body in a manner similar to the aforementioned embodiment of the R-8 collet. The spherically shaped member is larger in diameter than the stud, but is smaller in diameter than the body portion of the R-8 collet. The enlarged head in either the spherical or pinched waist embodiment may be machined integral with the R-8 collet, as a further embodiment itself, instead of being threadedly attached and/or inserted into the R-8 collet body.

Subsequent collets with their respective different tools mounted therein, and their alignment mechanisms threadedly received on the first end of the collet may therefore readily be inserted into the spindle of the vertical milling machine the lower end of which provides angular alignment with the angular surfaces of the tapered alignment sleeve and abutting relationship with the securement collar to permit simple and rapid changing of tools in a vertical milling machine, eliminating the necessity of readjusting the "Z" axis coordinates each time that tool is re-used.

The invention thus comprises a quick change R-8 collet for alignment within a spindle of a milling machine, the collet comprising an elongated member having a first end of generally conical configuration with a bore arranged longitudinally therein. The improved R-8 collet has an improved second end for securement within a spindle in the machine. The invention is an improved R-8 collet for use for holding a tool in a spindle of a milling machine. The R-8 collet comprises an elongated member having a first end of generally conical configuration with a bore arranged longitudinally therein. The R-8 collet has a second end for securement within a spindle in the machine. The improvement for the R-8 collet comprises a gripping head attached to the second end of the R-8 collet for securing the R-8 collet within the spindle. The R-8 collet has a bore on its second end for receipt of the gripping head. The gripping head comprises a knob having a pinched portion thereon, for gripping thereof within the spindle. The gripping head includes a threaded stud arranged on one side thereof, for threadedly attaching the gripping head to the bore in the second end of the R-8 collet. The gripping head may comprise a sphere shaped member. The sphere shaped member has a threaded stud attached to one side thereof for threadedly attaching the sphere shaped member to the bore in the second end of the R-8 collet. The invention also includes a method of providing a rapid, properly aligned series of successive tools using R-8 collets, for use in a spindle of a vertical milling machine, without the requirement of re-adjusting the "Z" axis of each successive tool with respect to a work piece, comprising the steps of: placing a gripping head having a narrowed portion thereon, onto an upper end of a first R-8 collet; sliding the gripping head into a spindle; gripping the narrowed portion of the gripping head within the spindle by a draw bar arranged therewithin. The gripping head comprises a short member having a narrow, pinched mid-portion for gripping by the lower end of the draw bar. The gripping head may comprise a spherically shaped member with a threaded stud attached to one side thereof.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
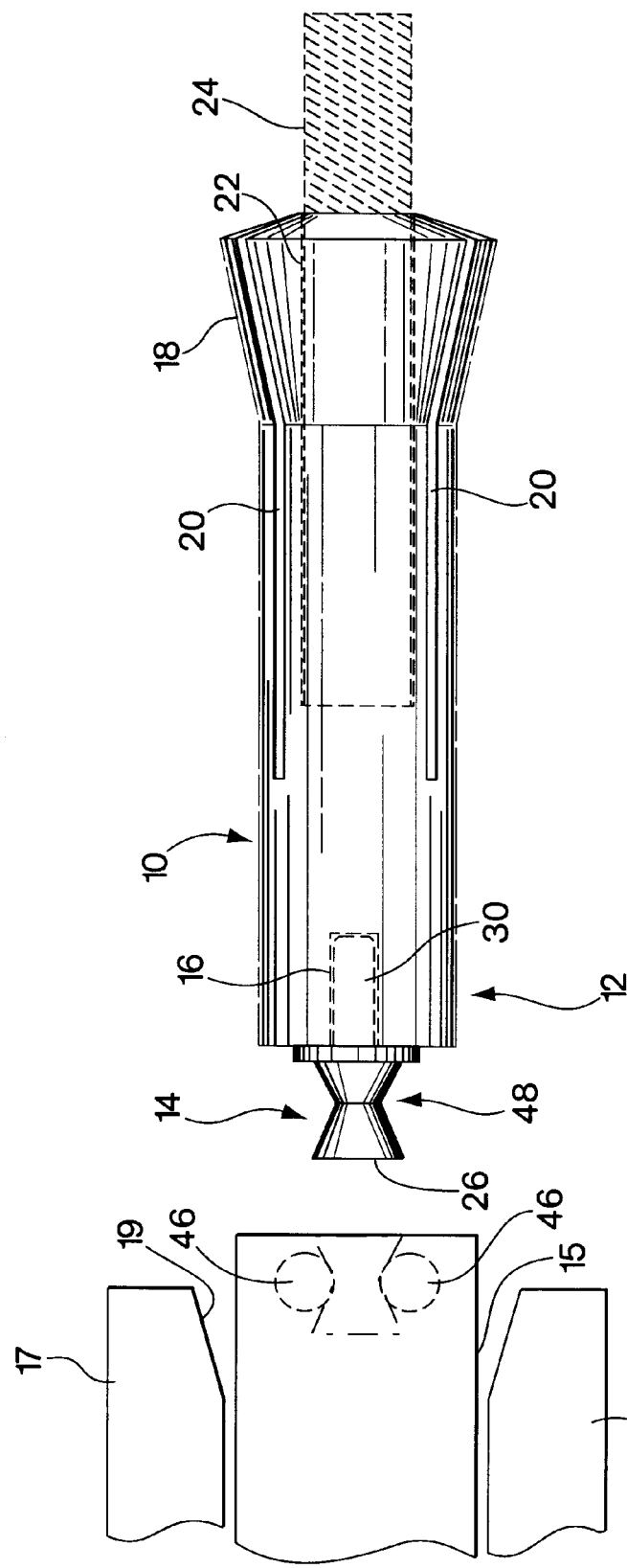
FIG. 1 is a side elevational view of a first embodiment of an improved R-8 collet for a vertical milling machine.

Referring now to the drawings in detail, and particularly to FIG. 1, there is shown the present invention, which comprises a collet 10 for use with a spindle of a Bridgeport type vertical milling machine having an adjustable tool-feed arrangement thereon, which accepts an "R-8" type collet. This type of vertical milling machine (not shown for convenience), typically includes a generally vertically disposed head which rotatably encloses a vertically arranged spindle 17, as identified in my aforementioned Patent Application.

Figure 2:
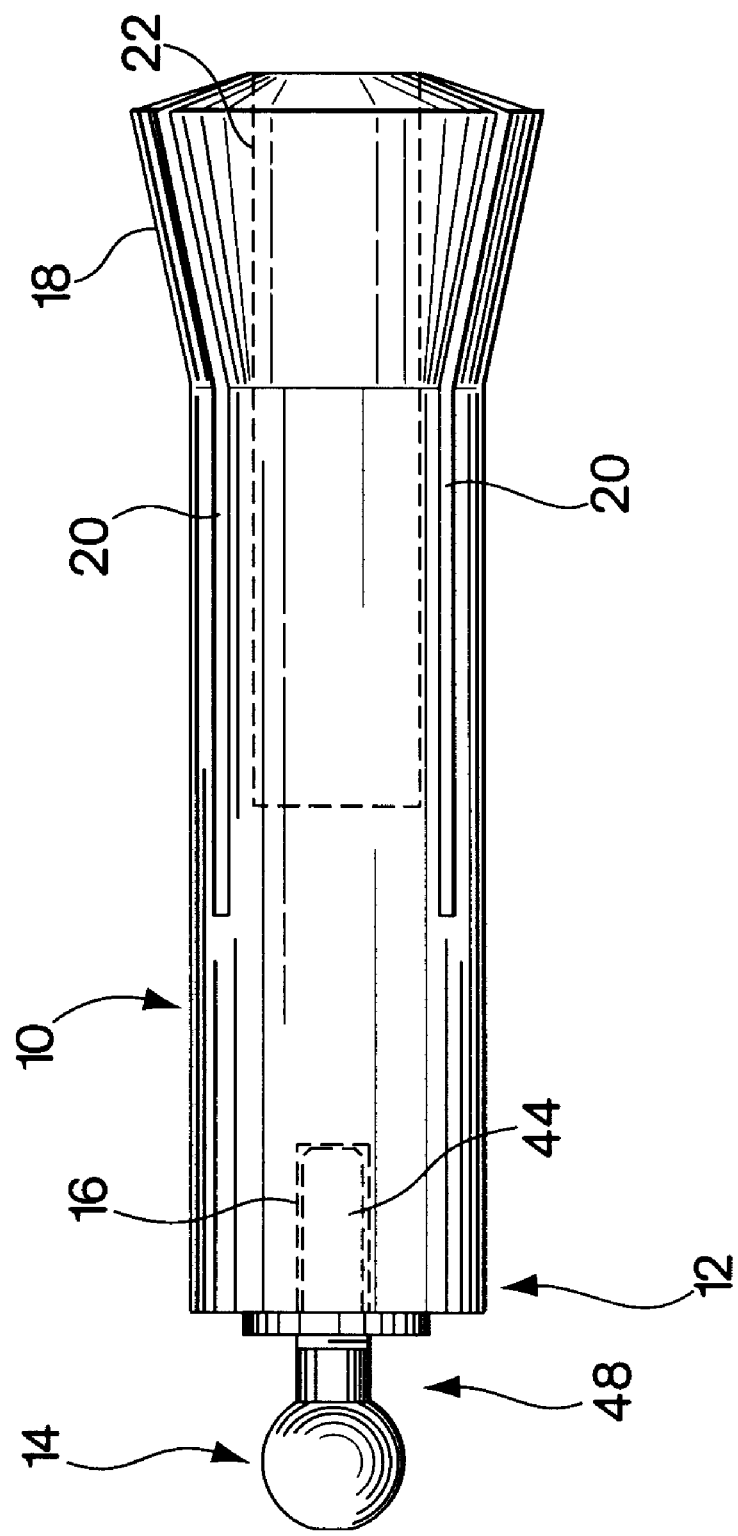
FIG. 2 is a side elevational view of a second embodiment of the improved R-8 collet shown in FIG. 1.

The collet 10 has a second or upper end 12 having a gripping head 14 secured within a female threaded bore 16 for securement of the head 14 to a draw bar 15 within the lower end of the spindle. The collet 10 has a first or lower end 18 which is tapered, as may be seen in FIGS. 1 and 2, so as to typically mate with the tapered (conically shaped) internal surfaces 19 at the lower end of a spindle 17. The tapered first end 18 of the collet 10 has a plurality of radially directed cuts 20 extending from a central, longitudinally directed bore 22 within, as is shown in FIGS. 1 and 2. The bore 22 is arranged to receive the securement end of the milling tool 24.

The present improved R-8 collet 10 gripping head 14 comprises a short, enlarged head that is receivable by the gripping arrangement draw bar 15 at the lower end of the spindle 17. The enlarged head 14, no wider than the body of the "R-8" collet 10, in a first preferred embodiment comprises a first knob 26 of circular cross-section having a pinched mid-portion 28, as shown in FIG. 1. The pinched mid-portion 28 permits the lower end of the draw bar 15 to encircle the narrowed mid-portion 28 and hold it securely. The first knob 26 has a lower stud end 30 with external threads thereon. The stud end 30 is threadedly received in the threaded female bore 16 in the upper end 12 of the body of the R-8 collet 10.

The improved R-8 collet 10 in a second embodiment, as shown in FIG. 2, has an enlarged head 40 consisting of a spherically shaped member 42 with a threaded stud 44 attached at one side thereof. The threaded stud 44 is threadedly mated with the threaded female bore 16 in the upper end 12 of the body of the R-8 collet 10 in a manner similar to the aforementioned embodiment of the R-8 collet. The spherically shaped member 42 is larger in diameter than the stud 44, but is smaller in diameter than the body portion of the R-8 collet 10. The lower end of a draw bar 15 is arranged to surround the gripping head 14 attached to the second end 12 of the R-8 collet 10, and grip the head 14 by an arrangement of encirclement members 46 disposed around the narrow portion 48 of the gripping head 14.

Subsequent collets 10 with their respective different tools 24 mounted therein may therefore be readily inserted into the spindle of the vertical milling machine. The spindle alignment need be done only once for each tool/collet to permit simple and rapid changing of tools in a vertical milling machine, eliminating the necessity of re-adjusting the "Z" axis coordinates for each successive tool each time that tool is needed.

What is claimed is:

1. An improved R-8 collet for use for holding a tool in a spindle of a milling machine, said R-8 collet comprising an elongated member having a first end of generally conical configuration with a bore arranged longitudinally therein, said R-8 collet having a second end for securement within a spindle in said machine, said improvement for said R-8 collet comprising:

a spherically shaped gripping head arranged on said second end of said R-8 collet for securing said R-8 collet to a draw bar within said spindle; and a bore on said second end of said collet for receipt of said gripping head.

2. A method of providing a rapid, properly aligned series of successive tools in an R-8 collet, for use in a spindle of a vertical milling machine, without the requirement of re-adjusting the "Z" axis of each successive tool with respect to a work piece, comprising the steps of:

placing a gripping head having a narrowed portion thereon, onto an upper end of a first R-8 collet having a tool therewith;

sliding said gripping head into a spindle;

gripping said narrowed portion of said gripping head within said spindle by a draw bar therewithin to secure said first R-8 collet for use in said machine.

3. The improved R-8 collet as recited in claim 1, wherein said gripping head comprises a knob having a pinched portion thereon, for gripping thereof within said spindle.

4. The improved R-8 collet as recited in claim 1, wherein said gripping head includes a threaded stud arranged on one side thereof, for threadedly attaching said gripping head to said bore in said second end of said R-8 collet.

5. The method as recited in claim 2, wherein said gripping head comprises a short member having a narrow, pinched mid-portion for gripping by said draw bar.

6. The improved R-8 collet as recited in claim 1, wherein said spherically shaped member has a threaded stud attached to one side thereof for threadedly attaching said spherically shaped member to said bore in said second end of said R-8 collet.

7. The improved R-8 collet as recited in claim 1, wherein said gripping head is machined integral with said collet.

8. The method as recited in claim 5, wherein said gripping head comprises a spherically shaped member with a threaded stud attached to one side thereof.

* * * * *